(Model.)

2 Sheets—Sheet 1.

F. BEATTIE.
LIFTING DOG FOR CRANES.

No. 542,229.

Patented July 9, 1895.

Witnesses:
J. H. Shumway
Geo. E. Hall

Frank Beattie
Inventor
By Attys
Earle & Seymour (Model.)
F. BEATTIE.
LIFTING DOG FOR CRANES.
No. 542,229.    Patented July 9, 1895.
2 Sheets—Sheet 2.
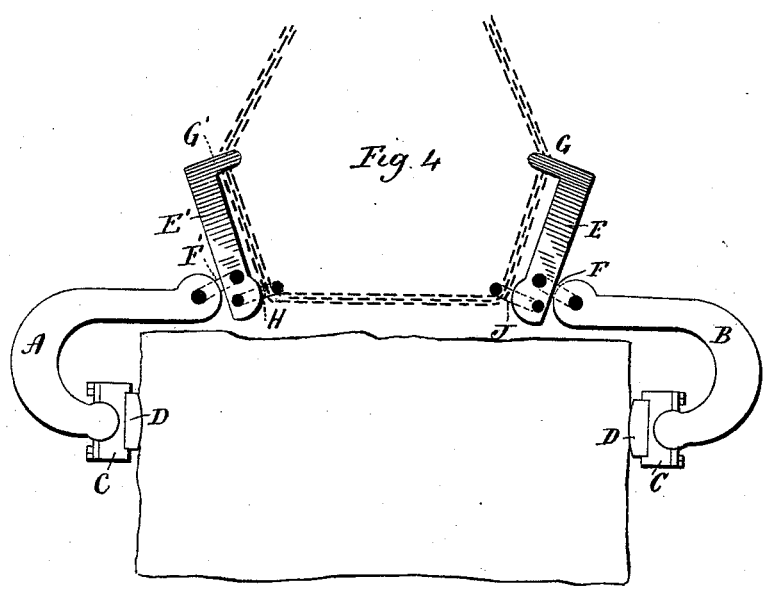

UNITED STATES PATENT OFFICE.

FRANK BEATTIE, OF LEETE ISLAND, CONNECTICUT.

LIFTING-DOG FOR CRANES.

SPECIFICATION forming part of Letters Patent No. 542,229, dated July 9, 1895.

Application filed September 7, 1894. Serial No. 522,315. (Model.)

*To all whom it may concern:*

Be it known that I, FRANK BEATTIE, of Leete Island, in the county of New Haven and State of Connecticut, have invented a new Improvement in Lifting-Dogs for Cranes; and I do hereby declare the following, when taken in connection with the accompanying drawings and the letters of reference marked thereon, to be a full, clear, and exact description of the same, and which said drawings constitute part of this specification, and represent, in—

Figure 1:
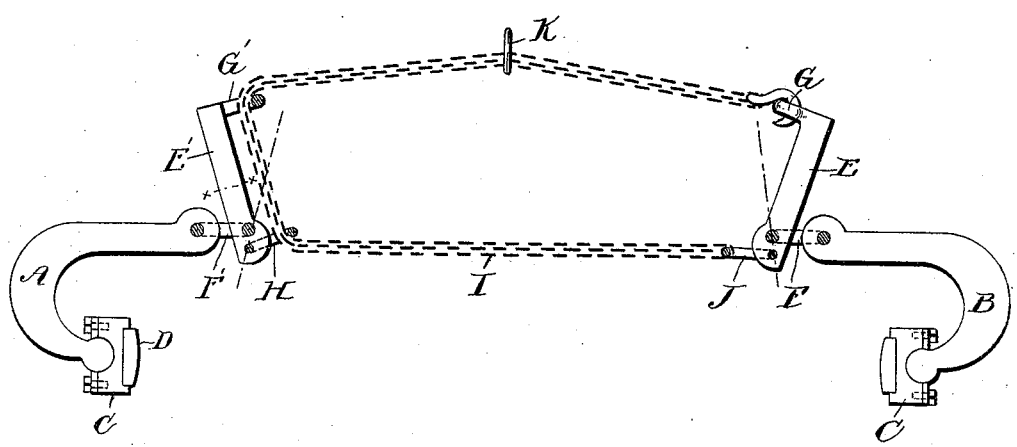
Figure 2:
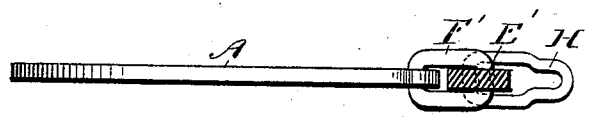
Figure 3:

Figure 1, a side view of the apparatus ready to be engaged with a stone; Fig. 2, a sectional view on line $x\ x$ of Fig. 1; Fig. 3, a top view of one of the jaws; Fig. 4, a side view of the apparatus engaged with a stone.

This invention relates to an improvement in lifting-dogs for cranes, and particularly such as are adapted for raising blocks of stone which it is desirable to raise without inserting instruments of any kind for the purpose of securing a sufficient hold.

The object of the invention is to produce a device in which the grip upon the stone will be made under considerable force before the lifting operation takes place; and it consists in the construction hereinafter described, and particularly recited in the claims.

As herein shown, the device consists of two jaws A B, the ends of which are provided with bearing-blocks C, which are preferably united to the ends of the jaws by a universal joint, and the bearing-surfaces of the blocks are adapted to receive removable faces D of wood or other suitable material. The upper ends of the jaws are connected to arms E and E' by links F and F'. These arms are constructed at their upper ends with inwardly-projecting eyes G and G'. At the lower end of the arm E' and below the link F' a link H is attached, the outer end of the link being contracted, as shown in Fig. 2. The lifting-chain I is secured to a link J, which is attached to the lower end of the arm E below the link F. The said chain then passes upward through the link H and through the eye G' and through a link K, which is attached to a pulley-block of the crane, which is not shown, the said link K being contracted at its lower end in a similar manner to the link H, before described. The chain thence passes to and is hooked into the eye G.

In adjusting the dogs upon a stone, the chain is drawn through the link H under as great tension as possible by hand, which tension throws the upper ends of the arms outward, as shown in full lines in Fig. 1. The chain then engages in the contracted portion of the link H. The chain is also engaged with the link K in the desired position for raising the stone at a proper angle. As the power is applied to raise the link K, the chain is drawn upward, and the first tendency will be to draw the upper ends of the arms forward, as shown in broken lines in Fig. 1. As the chain is securely attached to the lower ends of the arms by the links J H and below the point of connection between the jaws and the said arms, it necessarily follows that such strain will tend to clamp the blocks C C more securely against the stone before the actual raising takes place. By contracting the ends of the links H K their engagement with the chain at any desired point is made secure.

It is apparent that various changes may be made in the manner of connecting the chain to the arms. For instance, the free end of the chain might be passed downward through the eye G and engaged with the other end of the chain, or a continuous chain may be employed, as shown in Fig. 4, which may be engaged by the links H J and extend upward through the eyes G G' and through the link K of the lifting mechanism, such an arrangement being too apparent to require illustration. I would therefore have it understood that I do not wish to be limited to the exact construction shown; nor do I do wish to be understood as claiming, broadly, dogs for cranes in which the initial pressure of the lifting mechanism is exerted to force the jaws into engagement with the article to be lifted; but What I do claim is—

1. In lifting dogs for cranes, the combination with the jaws thereof, of two arms pivotally connected with the upper ends of said jaws, said arms constructed with eyes at their upper ends, and provided with links at their lower ends, below the point of connection to the said jaws, and a chain connecting said links and eyes and adapted to be engaged by the lifting mechanism, substantially as and for the purpose described.

2. The herein described lifting dogs for cranes, consisting of two jaws, each provided with a face for engagement with the article to be lifted, arms secured to the upper ends of said jaws, said arms constructed with eyes at their upper ends, and a chain secured to the lower end of one arm, below its point of connection to the jaw, through a link secured to the lower end of the second arm, upward through the eye of said second arm and into connection with the eye of the first arm, substantially as described.

In testimony whereof I have signed this specification in the presence of two subscribing witnesses.

FRANK BEATTIE.

Witnesses:
  M. C. BEATTIE,
  CARRIE I. BEATTIE.